Feb. 26, 1935. A. H. DIXON ET AL. Re. 19,477

METHOD OF MAKING SHREDDERS

Original Filed Oct. 21, 1929

Albert H. Dixon,
Ferdinand A. Henschell
and Thomas Simpson Robson
INVENTORS

BY Victor J. Evans
ATTORNEY

Reissued Feb. 26, 1935

Re. 19,477

UNITED STATES PATENT OFFICE 19,477

METHOD OF MAKING SHREDDERS

Albert H. Dixon, Seattle, Wash., and Thomas S. Robson, Victoria, British Columbia, and Ferdinand A. Henschell, Vancouver, British Columbia, Canada, assignors to Rapid Manufacturing Co. Inc., Seattle, Wash., a corporation of Washington Original No. 1,768,462, dated June 24, 1930, Serial No. 401,268, October 21, 1929. Application for reissue June 20, 1932, Serial No. 618,346

5 Claims. (Cl. 76—104)

The general object of the invention is to provide a method for forming teeth on sheets of metal, wherein the operation of forming the teeth will give them a beveled cutting edge making unnecessary the preparation of such edge by a subsequent sharpening operation.

This invention also consists in certain other features of construction and in the combination and arrangement of the several parts, to be hereinafter fully described, illustrated in the accompanying drawing and specifically pointed out in the appended claims.

In describing the invention in detail, reference is had to the accompanying drawing wherein like characters denote like or corresponding parts throughout the several views, and in which.

Figure 1:
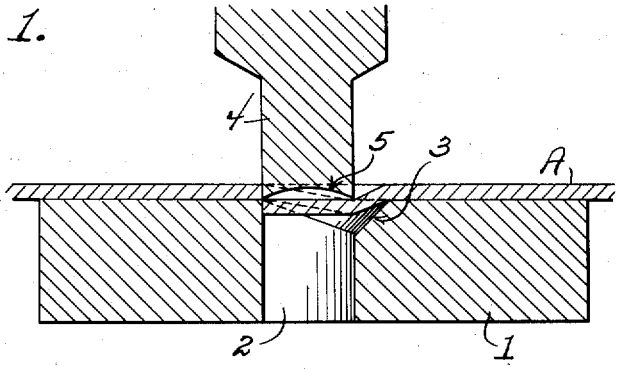
Figure 1 is a sectional view showing the first part of the punching operation for forming a hole and beveling the cutting edge of a tooth to be formed on a member.
Figure 2:
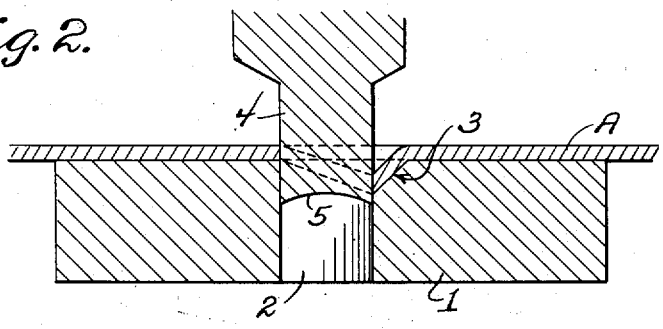
Figure 2 is a similar view showing the completion of the operation.
Figure 3:
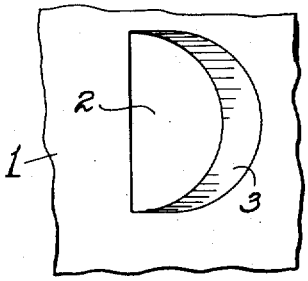
Figure 3 is a view of the hole and beveled part formed by the before mentioned operation.
Figure 4:
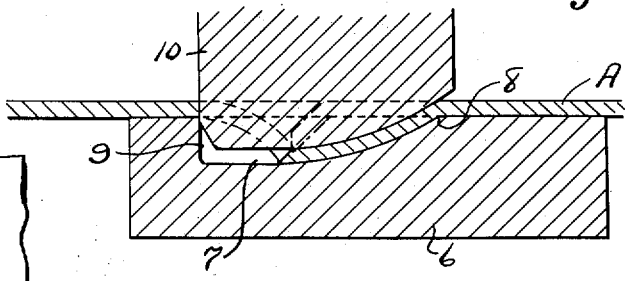
Figure 4 is a sectional view showing how the metal is pressed adjacent the hole previously formed therein to form the tooth.

This invention relates primarily to the formation of the teeth of a shredder device, such as that forming the subject matter of Patent No. 1,768,463, though, of course, the invention is not limited to this use. The first step of forming each tooth in the metal plate A, which may be the body of the shredder, consists in placing the metal on a female die 1 having an opening 2 therein, the upper part of which is formed with a beveled enlargement 3. Then a punch 4, having a cutting edge 5, is forced through the metal into the opening 2, as shown in Figures 1 and 2. This operation initially shears the metal for a part of the perimeter of the scrap to be removed and thereafter depresses the stock at the unsheared part of the scrap, the depressed portion being forced into the beveled enlargement in which, when it is firmly seated therein, further movement of the punch completes the shearing and the scrap is forced through the die opening. By reason of depressing the stock into the enlargement, the upper face becomes disposed at an acute angle to the axis of the punch prior to completing the shearing operation and the edge formed when the scrap is completely severed is at a acute angle to the face of the blank or plate, this acute edge becoming the cutting edge when the blank is subjected to the operation of the forming dies. The blank is then placed on the female forming die 6 having the recess 7 therein which gradually increases in depth from the point 8 to the straight wall 9, the recess being of curved shape in cross section. The male die 10 which is of the same conformation as the recess then depresses the stock into the latter, deflecting it from the plane of the plate and completing the formation of the tooth, the previously formed acute edge of which is then disposed at a more acute angle to the plate than formerly, as shown in Figure 4. Thus a raised portion constituting a tooth is formed on the metal sheet and has a sharp beveled cutting edge spanning the opening from which the scrap was removed.

It is thought from the foregoing description that the advantages and novel features of the invention will be readily apparent.

It is to be understood that changes may be made in the construction and in the combination and arrangement of the several parts, provided that such changes fall within the scope of the appended claims.

The invention having been described, what is claimed as new and useful is:

1. The herein described method of forming teeth on a sheet of material consisting in punching a hole in the sheet and bending a portion of the sheet adjacent the hole at an angle so that that part of the wall of the hole in said bent portion is beveled, then pressing the sheet at one side of the hole outwardly beyond the plane of the sheet whereby the bent portion is further bent and forms part of the outwardly bent portion so as to produce a tooth having a beveled edge.

2. The herein described method of forming teeth in a sheet of material consisting in placing the sheet on a die having an opening therein, the upper end of which is formed with a beveled enlargement and then pressing the punching die through the metal into the opening, whereby a portion of the metal will be bent against the beveled enlargement and then the metal cut to provide an opening, the wall of which that is contained in the bent part being beveled and then placing the sheet between two other dies to press the metal at one side of the opening into a tooth, the cutting edge of which is formed by the before mentioned beveled wall of the opening.

3. The method of forming cutting elements in sheet material which comprises partially shearing the sheet, deflecting from the plane of the sheet a small area of the material still connected with the scrap, then completing the severing of tion and adjacent material of the sheet to throw the edge from which the scrap was finally severed to a pronounced inclination to the plane of the sheet.

4. The method of forming cutting elements in sheet material which comprises partially severing the sheet, deflecting from the plane of the sheet the material adjacent the severed portion but remaining connected with the scrap, then completing the severance of the scrap to form a beveled edge on the deflected portion, and then depressing from the plane of the sheet the deflected portion and adjacent material to throw the beveled edge at a pronounced inclination to the plane of the sheet.

5. The method of forming cutting elements in sheet material which comprises slitting the sheet, bulging a small area of the sheet at one side of the slit with the slit as one of the boundary lines of the bulge, and finally shearing the scrap from the bulged portion to leave an opening in the sheet and form a beveled edge becoming the cutting edge when the blank is subjected to a further forming operation.

ALBERT H. DIXON.
THOMAS S. ROBSON.
FERDINAND A. HENSCHELL.